(12) United States Patent
Feldchtein et al.

(10) Patent No.: US 6,992,776 B2
(45) Date of Patent: Jan. 31, 2006

(54) METHOD FOR STUDYING A SAMPLE AND OPTICAL INTERFEROMETER FOR DOING THE SAME

(75) Inventors: Felix I. Feldchtein, Mayfield Village, OH (US); Paul G. Amazeen, New Castle, NH (US); Grigory V. Gelikonov, Nizhny Novgorod (RU); Valentin M. Gelikonov, Nizhny Novorod (RU)

(73) Assignee: Imalux Corporation, Cleveland, OH (US)

( * ) Notice: Subject to any disclaimer, the term of this patent is extended or adjusted under 35 U.S.C. 154(b) by 343 days.

(21) Appl. No.: 10/367,396

(22) Filed: Feb. 14, 2003

(65) Prior Publication Data

US 2003/0174339 A1   Sep. 18, 2003

Related U.S. Application Data

(60) Provisional application No. 60/356,798, filed on Feb. 14, 2002.

(51) Int. Cl.
*G01B 9/02* (2006.01)
(52) U.S. Cl. ........................... 356/479; 356/497
(58) Field of Classification Search ............... 356/479, 356/497
See application file for complete search history.

(56) References Cited

U.S. PATENT DOCUMENTS 5,268,738 A * 12/1993 Baney et al. ............... 356/479
5,291,267 A * 3/1994 Sorin et al. ................ 356/479
5,975,697 A * 11/1999 Podoleanu et al. ......... 351/206
6,201,608 B1 * 3/2001 Mandella et al. .......... 356/491
6,680,779 B2 * 1/2004 Toida ........................ 356/479

FOREIGN PATENT DOCUMENTS

WO   WO 03/069272 A1   8/2003

OTHER PUBLICATIONS

International Search Report dated May 20, 2003 related to PCT/RU 03/00041.

* cited by examiner

*Primary Examiner*—Hwa Lee
(74) *Attorney, Agent, or Firm*—Tucker Ellis & West LLP

(57) ABSTRACT

The present invention relates to the study of internal structure of objects by optical means. The invention presents a bi-directional sampling optical path for the low coherent optical radiation directed to the sample, i.e. a bi-directional sampling arm, and two unidirectional reference beams directed along a reference path designed as a loop. One of the reference beams propagates clockwise and the other propagates counterclockwise in the reference loop. The beam splitters non-reciprocal or polarization-dependent and by placing polarization-changing elements between the beam splitters and/or into the sampling arm and the reference loop. Thus the developed method and optical interferometer make possible to ensure highly efficient use of optical source power together with optimal signal-to-noise ratio for a given optical source power and are simple and cost effective.

12 Claims, 1 Drawing Sheet

METHOD FOR STUDYING A SAMPLE AND OPTICAL INTERFEROMETER FOR DOING THE SAME

CROSS-REFERENCE TO RELATED APPLICATIONS

This application is based on and claims priority to provisional U.S. patent application Ser. No. 60/356,798, which was filed on Feb. 14, 2002.

FIELD OF THE INVENTION

The present invention relates to physical engineering, in particular, to the study of internal structure of objects by optical means, and can be used in low coherence reflectometers and devices for optical coherence tomography applied, for example, for medical diagnostics of individual organs and systems including in vivo or in vitro diagnostics, as well as for industrial diagnostics such as control of technological processes.

BACKGROUND OF THE INVENTION

A virtue of optical interferometers applied for studying objects with the use of short coherence optical radiation is a potential for acquisition of images of turbid media with high spatial resolution as well as noninvasive diagnostics in medical studies and non-destructive control in diagnostics of various equipment.

Optical interferometers being part of low coherence reflectometers and devices for optical coherence tomography are well known (see, for example, U.S. Pat. Nos. 5,321,501; 5,383,467; 5,459,570; 5,582,171; 6,134,003; International application No. WO 00/16034). Sometimes the optical interferometer is fully or partially implemented by using bulk optic elements (U.S. Pat. No. 5,383,467), but more often optical interferometers for these applications are made fiberoptic (U.S. Pat. Nos. 5,321,501; 5,459,570; 5,582,171).

The optical interferometer is typically designed as a Michelson interferometer (see X. Clivaz et al., High Resolution Reflectometry in Biological Tissues, Optics Letters, vol. 17, No. 1/Jan. 1, 1992, and also J. A. Izatt, J. G. Fujimoto et al., Optical Coherence Microscopy in Scattering Media, Optics Letters, vol. 19, No. 8/Apr. 15, 1994, p.590–592) or as a Mach-Zehnder interferometer (see J. A. Izatt, J. G. Fujimoto et al., Micron-Resolution Biomedical Imaging with Optical Coherence Tomography, Optics & Photonics News, October 1993, vol. 4, No. 10, p.14–19, and also U.S. Pat. No. 5,582,171). Regardless of the specific design used, an optical interferometer typically comprises a short coherent length light source, one or two beam splitters, sample and reference arms, and at least one photodetector. The sampling arm includes, as a rule, an optical measuring probe, the end of the reference arm being provided with a reference mirror (see A. Sergeev et al., In Vivo Optical Coherence Tomography of Human Skin Microstructure, Proc. SPIE, v. 2328, 1994, p. 144, and also X. J. Wang et al., Characterization of Human Scalp Hairs by Optical Low Coherence Reflectometry. Optics Letters, vol. 20, No. 5, 1995, pp. 524–526).

In a Michelson interferometer the sample and reference arms are bi-directional with a reference mirror placed at the end of the reference arm. For performing in-depth scanning the reference mirror either is connected to a device for moving said mirror mechanically (U.S. Pat. Nos. 5,321,501; 5,459,570), or its position is fixed and the in-depth scanning is performed with a piezoelectric scanning element (RU Pat. No. 2,100,787), or with a dispersion-grating optical delay line (K. F. Kwong, D. Yankelevich et al., 400-Hz Mechanical Scanning Optical Delay Line, Optics Letters, vol. 18, No. 7, Apr. 1, 1993).

The Michelson interferometers shown in background art, all execute intrinsically the same method for studying a sample (see U.S. Pat. Nos 5,321,501; 5,383,467; 5,459,570; RU Pat. No. 2,148,378). According to this method, a low coherent optical radiation beam is split into two beams. One of the beams is directed towards a sample along a sampling optical path and focused on the sample, while the other one is directed along a reference optical path. The low coherent optical radiation that passed along the sampling optical path in a forward and backward direction is combined with the low coherent optical radiation that passed along the reference optical path in a forward and backward direction, both the sampling and reference paths being bi-directional. Then the intensity of the low coherent optical radiation, which having passed along the sample path carries information about the sample, is visualized using a signal of interference modulation of the intensity of the optical radiation, which is a result of said combination.

The major drawback of Michelson interferometers, as well as of the executed method, is the low efficiency of use of optical source power. Even with the optimal splitting ratio in the coupler, which is 0.5 for a reciprocal configuration, a substantial portion of the input power is wasted in the reference arm and in the back way from the coupler/splitter to the light source. In addition, the optical radiation in the mentioned back way, contains an AC component representing the useful interference signal, whose amplitude is proportional to the one detected by the photodetector. This component could be used in another interferometer configuration to improve the signal-to-noise ratio (SNR), but is wasted in the Michelson interferometer and moreover, negatively impacts most known sources of a broadband optical radiation (e.g., semiconductor superluminescent diodes, doped-fiber amplified spontaneous emission superlums, solid state and fiberoptic femtosecond lasers).

A Mach-Zehnder interferometer doesn't return any substantial optical power back to the source and is more flexible in power splitting and coupling between arms because two different couplers are used for splitting optical radiation between reference and sampling arms and for combining optical radiation. Also, the second optical channel containing an anti-phase AC interference component is easily available and typically used in a differential detection arrangement to improve the SNR. Since it has unidirectional arms, it requires an optical circulator in the sampling arm to work with reflective samples (which is so far the only practical way to use low-coherence interferometry for biotissue imaging because penetration depth is fundamentally limited by light scattering to 2–3 mm and human and animal tissues and organs are much thicker). The most natural way for in-depth scanning with the Mach-Zehnder interferometer is with an in-line (transmissive) delay line, for example, a piezofiber optical delay. It is more common in the art to use reflecting delay lines based on a moving mirror, diffraction grating line, rotating mirrors, prisms, cams, and helicoid mirrors, but with the expense of another optical circulator added into the reference arm. In comparison with the Michelson interferometer, a transmissive delay line can only provide 50% of optical path modulation (and therefore 50% scanning depth) for the same delay element because of unidirectional rather than bi-directional operation.

Mach-Zehnder interferometers execute a slightly different method described, for example, in U.S. Pat. No. 6,485,413 and International application No. WO 00/16034. According to this method, a low coherent optical radiation beam is split into two beams. One of the beams is directed towards a sample along a first part of a unidirectional sampling optical path and focused on the sample. The other beam is directed along a unidirectional reference optical path. The low coherent optical radiation that carries information about the sample is directed along a second part of the unidirectional sampling optical path with the help of an additional optical system. Then optical radiations, which passed along the sampling and reference optical paths in a forward direction, are combined. The intensity of the low coherent optical radiation, which having passed along the sampling path and carries information about the sample, is visualized using a signal of interference modulation of the intensity of the resulting combined optical radiation. This method coupled with the Mach-Zehnder interferometer provides highly efficient use of the source power.

In-depth scanning of the sample in both methods can be implemented by changing the difference in the optical lengths of the optical paths for the first and the second optical radiation beams. Lateral scanning of the sample may also be carried out by the invention.

A hybrid method for studying a sample is known from International application No. WO 00/16034. According to this method, a low coherent optical radiation beam is split into two beams. One of the beams is directed towards a sample along a first part of a unidirectional sampling optical path, while the other beam is directed along a bi-directional reference optical path. The low coherent optical radiation that carries information about the sample is then directed along a second part of the unidirectional sampling optical path with the help of an additional optical system. Then optical radiations, which passed along the unidirectional sampling path in a forward direction and along the bi-directional reference optical path in a forward and backward direction are combined and the intensity of the low coherent optical radiation, which having passed along the sampling path carries information about the sample, is visualized using a signal of interference modulation of the intensity of the optical radiation, which is a result of said combination.

The hybrid interferometer described in the same International application No. WO 00/16034 comprises a low coherent length light source, two beam splitters, sample and reference arms, and at least one photodetector. The low coherent length light source is connected to the first port of the first beam splitter. The sampling arm is unidirectional and comprises two parts, the first part being connected to the second port of the first beam splitter. The first part of the sampling arm is provided with a probe, the latter including an optical system for focusing the first beam of low coherent optical radiation on the sample. The second part of the sampling arm is provided with an additional optical system for collecting light from the sample and taking the optical radiation, which carries information about the sample, to the first port of the second beam splitter. The third port of the first beam splitter is connected with the third port of the second beam splitter. The fourth port of the first beam splitter is connected to the reference arm, which is bi-directional, the distal end of the reference arm being provided with a reference mirror. A respective photodetector is connected to the second and fourth ports of the second beam splitter.

A drawback of the hybrid method, as well as the hybrid interferometer described in the International application No. WO 00/16034, is the necessity of an additional optical system for collecting light carrying information about the sample. The two optical systems (illuminating and collecting light) must be aligned and synchronously targeted to the same point in the sample with micron accuracy (the typical beam diameter at the tissue surface should be 15–30 $\mu$m), since even one beam diameter mismatch will lead to a complete loss of optical power collected by the second part of the sampling arm. In addition, some portion of the reference arm power inevitably returns back to the source, which may negatively impact the source performance.

A method and interferometer which makes highly efficient use of an optical power source, provides optimal signal-to-noise ratio, is simplified in use and more cost-effective is therefore desirable and provided by this invention.

SUMMARY OF THE INVENTION

The present invention is directed to a method and apparatus to expand the family of methods and optical interferometers, designed for studying samples with the use of low coherent optical radiation, which ensure highly efficient use of optical source power together with optimal signal-to-noise ratio for a given optical source power and are simple and cost-effective.

According to the developed method for studying a sample, a low coherent optical radiation is split into a first and second beam. The first beam of low coherent optical radiation is split into a third and fourth beam, the third beam being directed towards the sample under study along a bi-dixectional sampling optical path. The first beam propagates along the bi-directional sampling optical path in a forward and backward direction. The second and fourth beams of the low coherent optical radiation are directed along a reference optical path, formed as a loop, whereas the second beam propagates counterclockwise in the reference loop, while the fourth beam propagates clockwise in the reference loop. The optical radiation, which passed along the sampling optical path in a forward and backward direction, is then combined wit the optical radiation, which has propagated counterclockwise in the reference loop. Part of the optical radiation, which is a result of said combining, is further combined with the reference beam that has propagated clockwise in the reference loop. At least one signal of interference modulation of the intensity of the optical radiation, which is a result or said combining, is used to visualize the intensity of the optical radiation, which having passed along the sampling optical path carries information about the sample.

According to the invention the developed optical interferometer comprises a source of optical radiation, a first beam splitter, a sampling arm and a reference arm, the sampling arm being bi-directional, while the reference arm is formed as a loop, a second beam splitter, the first beam splitter being optically coupled to the sample through the ports of the second beam splitter, and at least one photodetector, wherein at least one of the beam splitters is optically coupled to a respective photodetector.

In one embodiment of the second modification of the optical interferometer at least one of the arms of the optical interferometer comprises an optical delay line.

In another embodiment at least one of the arms of the optical interferometer comprises a phase modulator.

In a different embodiment the sampling arm is provided with a probe located at its distal end.

In a particular embodiment at least a part of the sampling arm comprising the probe is designed fiberoptic.

In another particular embodiment at least one of the arms of the optical interferometer is designed fiberoptic.

In a different embodiment at least one of the beam splitters is designed fiberoptic.

In another embodiment the probe is made detachable and connected with the rest of the optical interferometer by a connecter.

In another embodiment the first beam splitter is designed nonreciprocal.

In a different embodiment the first beam splitter is designed polarization-sensitive and the sampling arm is provided with a polarization switch.

The nature of the invention will be evident from the following explanation. The invention presents a bi-directional optical path for the low coherent optical radiation directed to the sample, i.e. a bi-directional sampling arm, and two unidirectional reference beams directed along a reference path designed as a loop. One of the reference beams propagates clockwise and the other propagates counterclockwise in the reference loop. The beam splitter ratios can be optimized in substantially the same way by making beam splitters non-reciprocal or polarization-dependent and by placing polarization-changing elements between the beam splitters and/or into the sampling arm and the reference loop.

The developed optical interferometer ensures highly efficient use of an optical source power together with optimal signal-to-noise ratio for a given optical source power and is simple and cost-effective.

Additional objects, advantages and features of the invention will be set forth in part of the description which follows, and will become apparent to those skilled in the art upon examination of the following or may be learned by practice of the invention. The objects and advantages of the invention may be realized and attained by various structures and methods covered by the patent claims.

BRIEF DESCRIPTION OF DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

These and other features, aspects, and advantages of the present invention will become better understood with regard to the following description, appended claims, and accompanying drawing figures, where:

DETAILED DESCRIPTION OF THE INVENTION

Figure 1:
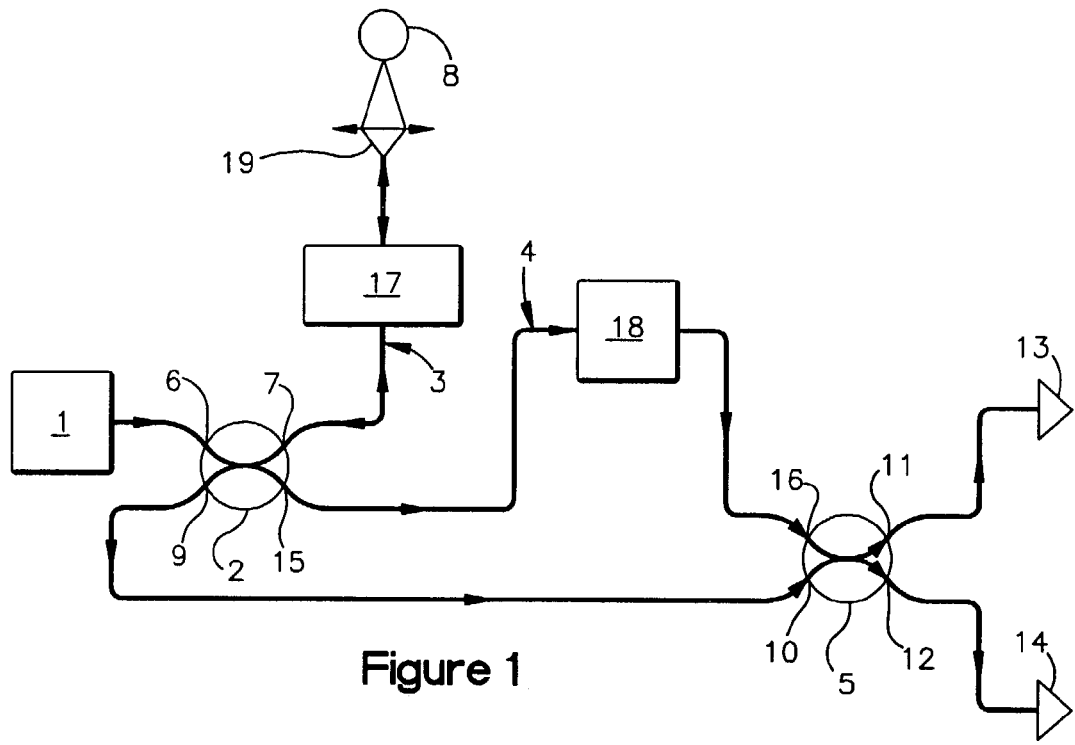
FIG. 1 is a schematic diagram of a prior art optical interferometer.

The optical interferometer is illustrated by means of an example of an optical fiber interferometer being part of a device for optical coherence tomography, although it is evident that they can be implemented with the use of bulk optic elements, and can be used as independent devices. The fiberoptic implementation is preferable for use in medical applications, especially in endoscopy, where flexibility of fiberoptics provides convenient access to different tissues and organs, including internal organs via an endoscope. However, the whole interferometer, or any part of it, can be implemented using traditional bulk optics, e.g., mirrors, prisms etc. Any such modification of the hybrid interferometer with unidirectional reference arm and bi-directional sampling arm is included within the scope of this invention.

The optical interferometer referred to in FIG. 2, operates as follows.

A source 20 forms an optical low coherent radiation beam, in a preferred embodiment, in the visible or IR range. The source 20 can be arranged, for example, as a semiconductor superluminescent diode, doped-fiber amplified spontaneous emission superlum, solid state or fiberoptic femtosecond laser. In the embodiment shown in FIG. 2 the source 20 is optically coupled to a first port 25 of a first beam splitter 21. The first beam splitter 21 splits the low coherent optical radiation beam into two beams. A second port 26 of the first beam splitter 21 is optically coupled to a sample 27 through a first port 28 and second port 29 of a second beam splitter 24. The first beam of low coherent optical radiation is directed to the first port 28 of the second beam splitter 24, which splits the first beam into a third beam and a fourth beam of low coherent optical radiation. Said third beam is directed to the sample 27 along the sampling optical path with the aid of a sampling arm 22. The distal part of the sampling arm 22 can contain a probe 38 for convenient access to the sample 27. The probe 38 can be made detachable and connected with the rest of the interferometer by a fiberoptic connecter. If the interferometer has polarization-maintaining fiber, the connector preferably should be polarization-maintaining as well. The probe 38 can be implemented using any design known in the art, for example, an endoscope, endoscopic probe, catheter, guidewire, needle, or the probe 38 may be implanted into the body, providing instant access to the internal organ. If the probe 38 is designed to image circumference (e.g. a catheter for intravascular imaging), it can be connected to the interferometer of FIG. 2.

The sample optical path formed by the sampling arm 22 is bi-directional. Hence the third beam of low coherent optical radiation propagates along the sample optical path in a forward direction from the second port 29 of the second beam splitter 24 through a first optical delay line 36 to the sample 27. At least part of the third beam is reflected from the sample 27 and then propagates along the sample optical path in a backward direction through the first optical delay line 36 to the second port 29 of the second beam splitter 24.

The reference optical path is formed as a reference loop/arm 23. Therefore said fourth beam propagates clockwise in the reference loop/arm 23 from a fourth port 31 of the second beam splitter 24 through a second optical delay line 37 to a fourth port 30 of the first beam splitter 21. Said second beam of low coherent radiation propagates counterclockwise in the reference loop/arm 23 from the fourth port 30 of the first beam splitter 21 through the second optical delay line 37 to the fourth port 31 of the second beam splitter 24.

The first optical delay line 36 and second optical delay line 37 are designed to change the difference between optical path lengths of the sampling arm 22 and the reference arm 23, i.e. to perform in-depth scanning of the sample 27. In the preferred embodiment, the first optical delay line 36 and the second optical delay line 37 are in-line piezofiber delay lines. In the preferred embodiment two similar elements are inserted into the reference arm 23 and the sampling arm 22 (one into each arm) and driven synchronously with appropriate polarity to combine the effect. However, all other known in the art optical path modulation means can he used, such as delay lines based on moving mirror(s), moving prism(s), diffraction grating line, rotating mirrors, prisms, cams and helicoid mirrors. Any reflective delay line can be converted into a transmissive line by using an optical circulator, as is well known in the art. Any known delay line can be used in one arm of the disclosed interferometer, or in both.

The second beam splitter 24 then combines the low coherent optical radiation reflected or backscattered from the sample 27 with said second beam, i.e. with the reference beam that has propagated counterclockwise in the reference loop/arm 23. Part of the optical radiation, which is a result of said combining, passes through the first port 28 of the second beam splitter 24 to the second port 26 of the first beam splitter 21. The first beam splitter 21 then combines said part of optical radiation with the fourth beam, i.e. with the reference beam that has propagated clockwise in the reference loop/arm 23. The first optical delay line 36 and the second optical delay line 37 provide a change in the difference between optical path lengths of the sampling arm 22 and the reference arm 23, respectively, with a constant velocity v, i.e. in-depth scanning of the sample 27. Changing in the difference of the optical lengths of the sampling arm 22 and the reference arm 23 leads to interference modulation of the intensity of combined optical radiation at a third port 32 of the first beam splitter 21 and at a third port 34 of the second beam splitter 24 at a Doppler frequency f=v/λ, where;

$v=d\Delta/dt$;

v is the changing speed of the optical path difference Δ; and

λ is the central wavelength of source 20.

The rule of interference modulation corresponds to the change in the intensity of optical radiation reflected or backscattered by the sample 27 at different depths. The result of said combining is then used to visualize the intensity of optical radiation, which having passed along the sampling arm 22 contains information about the sample 27. The latter is done as follows.

A first photodetector 33 and a second photodetector 34, which can be made as photodiodes, are connected respectively to the third port 32 of the first beam splitter 21 and to the third port 34 of the second beam splitter 24. The first photodetectors 33 and the second photodetector 34 receive AC interference signals produced by mixing Doppler frequency shifted (because of constant-speed in-depth scanning by the delay line) radiations from the reference arm 23 and the sampling arms 22. The first photodetectors 33 and the second photodetector 34 provide for conversion of the combined optical radiations from the third port 32 and the third port 34 of the second beam splitter 24 into electrical signals that may be processed separately or can arrive at a differential amplifier (not shown in the drawing) and further at a processing and displaying unit (not shown in the drawing). The processing and displaying unit can be analogous to a processing and displaying unit described in RU Pat. No. 2148378 and in the paper by V. M. Gelikonov et al., "Coherent Optical Tomography of Microinhomogeneities in Biological Tissues" JETP Left., v. 61, No 2, pp. 149–153. This data processing and displaying unit comprises a bandpass filter, a log amplifier, an amplitude detector, an analog-to-digital converter, and a computer, all elements being connected in series. The band-pass filter of the unit sorts the signal at a Doppler frequency, thereby improving the signal-to-noise ratio. Once the signal is amplified, it arrives at a detector that detects a signal proportional to the waveform envelope of this signal. The signal detected by to amplitude detector of the data processing and displaying unit is proportional to the signal of interference modulation of the intensity of the combined optical radiation. The analog-to-digital converter of the unit converts to signal from the output of the amplitude detector into a digital format. The computer of the data processing and displaying unit provides for acquisition of images by displaying on a video monitor the intensity of the digital signal (the displaying may be performed as described, for instance, in the paper by H. E. Burdick "Digital Imaging: Theory and Applications", 304 pp., McGraw Hill, 1997). Since the digital signal corresponds to the change in intensity of optical radiation reflected or backscattered from the sample 27 at different depths, the image visualized on the monitor corresponds to an image of the sample 27.

In preferred embodiments of the invention the probe 38 is made detachable and connected to the interferometer by a fiberoptic connecter. If the interferometer has polarization-maintaining fiber, the connector preferably should be polarization-maintaining as well. The probe 38 can be implemented using any design known in the art, for example, an endoscope, endoscopic probe, catheter, guidewire or needle, may be implanted into the body, providing instant access to the internal organ. If the probe 38 is designed to image circumference (e.g., a catheter for intravascular imaging), it can be connected with the rest of the interferometer using a rotary connector.

Figure 2:
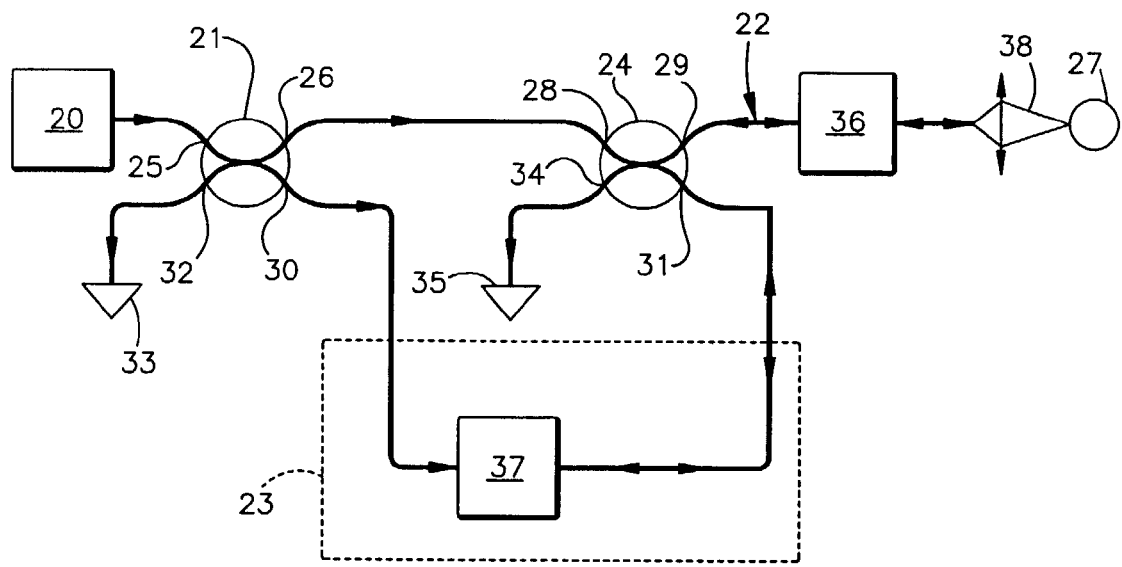
FIG. 2 is a schematic diagram of one particular embodiment the developed optical interferometer.

The probe 38 of FIG. 2, can include a lateral scanner, which can be made similar to that of the probe disclosed in RU Pat. No. 2148378.

In-depth scanning with a constant velocity in the optical interferometer implementing the first modification of the method for studying a sample, as well as in the optical interferometer implementing the second modification can be carried out with a delay line in FIG. 2 optical delay lines 36, 37) used in any one arm of the interferometer. However, it is preferable that the optical delay lines 36, 37 should contain a substantial amount of optical fiber and since another arm should have the same optical path and therefore similar amount of fiber it is beneficial to use this fiber to make the optical path modulation more efficient. For that reason in the preferred embodiment depicted in FIG. 2 two similar delay lines 36, 37, respectively, are inserted into the reference loop/arm 23, and sampling arm 22 (one into each arm) and driven synchronously with appropriate polarity to combine the effect. In-depth scanning can be carried out by phase modulation. In this case a phase modulator (not shown) can be placed into any arm, or into both arms in the embodiment of FIG. 2.

It is well known that static and dynamic polarization distortions can occur in any interferometer arm, causing interference signal fading. This effect can happen in any interferometer configuration known in the art, as well as in the new interferometer disclosed here. To prevent or compensate for this problem, different means known in the art can be used. They include polarization-maintaining (birefringent) or polarization-preserving (with high absorption for unwanted polarization) fibers, nonreciprocal elements (Faraday rotator), and polarization diversity receiver. Furthermore, polarization state modulation along with further extraction of polarization information from several sequentially acquired image frames may also be used. All the abovementioned means are compatible with the new interferometer design, as well as with previously disclosed designs found in the art. Also, polarization controllers and polarizers can be inserted into any arm to restore and rectify any required polarization state.

It is well known in the art that in order to achieve the best SNR possible, unequal splitting of the source power should be performed between the reference arm and the sampling arm. Disclosed modifications of the method and interferometer of the present invention, as well as Mach-Zehnder interferometer, are well suited for optimal power management, because splitting and mixing ratios are completely independent.

For the configuration of FIG. 2 the ratio can be optimized by making the first beam splitter 21 and second beam splitter 24 non-reciprocal or polarization-dependent and by placing polarization-changing elements such as a Faraday rotator, birefrigerant plate, or polarization controller (not shown in the drawings) between the first beam splitter 21 and the second beam splitter 24 and/or into the sampling arm 22 and the reference loop/arm 23. Then all available coupling ratios can be optimized, taking into consideration light source power, central wavelength and bandwidth, optical losses in different elements, photodetector efficiency and dark noise level, photocurrent preamplifier noise (voltage and current) level, acquisition rate, etc. The calculation is not performed in this application being relatively straightforward and known in the art. For a typical optical coherence topography configuration with a several milliwatt power source in the spectral range of 800–1300 nm (central wavelength) and coherence length of 10–15 μm. the forward pass in the first beam splitter 2 should split more than 95% of the power into the sampling arm 22. In any case, as much power as possible should be directed from the sampling arm 22 into the first beam splitter 21 for further mixing with the reference beam. It should be noted that with any splitting ratios in the first beam splitter 2 the optical power reflected back to the source 20 is virtually zero since the power level reflected from a biotissue is rarely more than 0.1%. With optimal coupling even this negligible power will not go back to the source 20.

It may be convenient to have an additional slow delay line to compensate for a difference in distance between the probe 38 (FIG. 2) and the sample 27 (FIG. 2), or change in probe-sample optical delay because of zoomed magnification, or variations in optical path length between different probes. This additional delay can be performed by inserting a piece of fiberoptic of given length into any arm by mechanical or fusion splicing, or by fiberoptic connectors. Also, the delay can be introduced by coupling the radiation into free space and back to the fiber and mechanically adjusting the gap where the collimated radiation propagates. Also, the reflective mechanical delay line, similar to the design typically being used in the Michelson interferometer, can be used for that purpose if combined with an optical circulator, which can be as simple as one polarizer combined with a Faraday rotator or birefrigent quarter-wave plate. Such a design can be beneficial when polarization change in the arm is required. A reflective mechanical delay line can be constructed with substantially reduced sensitivity (2 orders of magnitude) to mechanical misalignments or vibrations by using a retroreflector ("cat eye" or retroreflecting prism), and therefore reduce technical requirements and cost for gap adjustment in an optomechanical system.

It is well known that in addition to optical path equality between both arms, a low coherence interferometer requires wave dispersion equality, because any difference in wave dispersion between arms causes cross-correlation broadening and axial (in depth) resolution degradation. To compensate the dispersion difference between arms, in-line fiberoptic element(s) can be inserted by mechanical or fusion splicing, or by fiberoptic connectors. These elements can be constructed from pieces of optical fibers with dispersion properties different from the rest of the interferometer. Also, radiation in any arm can be coupled from the optical fiber into free space and then coupled back into the optical fiber. Appropriate bulk optical element(s) for dispersion compensation can be placed into the free space gap, where radiation is collimated (preferably) or focused/defocused. Such an element can be combined with the abovementioned mechanical optical delay line, either unidirectional or bi-directional.

What is claimed is:

1. A method for imaging a sample, comprising the steps of:
   forming a low coherent optical radiation;
   splitting the low coherent optical radiation into a first beam of low coherent optical radiation and a second beam of low coherent optical radiation;
   splitting the first beam of low coherent optical radiation into a third beam of low coherent optical radiation and a fourth beam of low coherent optical radiation;
   directing the third beam of low coherent optical radiation towards the sample under study along a bi-directional sampling optical path, wherein the third beam of low coherent optical radiation propagates along the bi-directional sampling optical path in a forward and a backward direction;
   directing the second beam of low coherent optical radiation and the fourth beam of low coherent optical radiation along a reference optical path, wherein the reference optical path is formed as a reference loop, the second beam of low coherent optical radiation passes through the reference loop in a first direction, and the fourth beam of low coherent optical radiation passes through the reference loop in a second direction;
   forming a first combination optical radiation by combining the third beam of optical radiation that having passed along the sampling optical path in a forward and a backward direction carries information about the sample with the second beam of optical radiation that has passed through the reference loop in the first direction;
   forming a second combination optical radiation by combining part of the first combination optical radiation with the fourth beam of optical radiation that has passed through the reference loop in the second direction; and
   visualizing the intensity of the third beam of optical radiation, that having passed along the sampling optical path carries information about the sample, by using either a signal of interference modulation of the intensity of the first combination optical radiation, or a signal of interference modulation of the intensity of the second combination optical radiation, or both.

2. The method of claim 1, wherein the first direction through the reference loop is counter-clockwise and the second direction through the reference loop is clockwise.

3. An optical interferometer comprising:
   a source of optical radiation;
   a first beam splitter for splitting the low coherent optical radiation into a first beam of low coherent optical radiation and a second beam of low coherent optical radiation;
   a bi-directional sampling arm;

a reference arm formed as a loop for low coherent optical radiation to propagate along the reference arm in a first and second opposite directions;

a second beam splitter for splitting the first beam of low coherent optical radiation into a third beam of low coherent optical radiation and a fourth beam of low coherent optical radiation and forming a first combination optical radiation by combining the third beam of optical radiation that has passed along the bi-directional sampling arm in a forward and backward direction with the second beam of low coherent optical radiation, that has passed along the reference loop in a first direction;

the first beam splitter being optically coupled to a sample through the ports of the second beam splitter, the first beam splitter forming a second combination optical radiation by combining part of the first combination optical radiation with the fourth beam of low coherent optical radiation that has passed through the reference loop in the second direction; and at least one photodetector, wherein at least one of the beam splitters is connected to a respective photodetector.

4. The optical interferometer of claim 3, wherein at least one of the arms of the optical interferometer comprises an optical delay line.

5. The optical interferometer of claim 3, wherein at least one of the arms of the optical interferometer comprises a phase modulator.

6. The optical interferometer of claim 3, wherein the sampling arm is provided with a probe located at its distal end.

7. The optical interferometer of claim 3, wherein at least one of the arms of the optical interferometer is designed fiberoptic.

8. The optical interferometer of claim 3, wherein at least one of the beam splitters is designed fiberoptic.

9. The optical interferometer of claim 6, wherein the probe is made detachable and connected with the optical interferometer by a connecter.

10. The optical interferometer of claim 3, wherein the first beam splitter is designed nonreciprocal.

11. The optical interferometer of claim 3, wherein the first beam splitter is polarization-sensitive and the sampling arm is provided with a polarization switch.

12. The optical interferometer of claim 6, wherein at least a part of the sampling arm comprising the probe is designed fiberoptic.

* * * * *